(12) United States Patent
Tanaka

(10) Patent No.: US 6,904,142 B1
(45) Date of Patent: Jun. 7, 2005

(54) DIGITAL EXCHANGING APPARATUS AND METHOD OF COMMUNICATION CONTROL

(75) Inventor: Makoto Tanaka, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/570,024

(22) Filed: May 12, 2000

(30) Foreign Application Priority Data

Sep. 10, 1999 (JP) .............................. 11-256553

(51) Int. Cl.[7] .......................... H04M 7/00; H04M 3/00
(52) U.S. Cl. ........................ 379/221.04; 379/221.03; 379/279
(58) Field of Search ........................ 379/219, 220.01, 379/221.01, 221.03, 221.04, 279

(56) References Cited

U.S. PATENT DOCUMENTS

| | | | |
|---|---|---|---|
| 5,923,643 A | * | 7/1999 | Higgins et al. ............. 370/218 |
| 6,359,858 B1 | * | 3/2002 | Smith et al. ................ 370/217 |
| 6,396,847 B1 | * | 5/2002 | Rezaie et al. .............. 370/468 |

FOREIGN PATENT DOCUMENTS

JP          11-046207          2/1999

* cited by examiner

*Primary Examiner*—Ahmad F. Matar
*Assistant Examiner*—Hector Agdeppa
(74) *Attorney, Agent, or Firm*—Venable LLP; Catherine M. Voorhees

(57) ABSTRACT

IP-PBXs having different structure, for example, stand-by and active transmission lines are connected between unused pins of the interface block 24A and 24B to supply the relay driving signal from the switching block 20A to the switching block 20B according to a control signal from the control block 18, and change the transmission lines, and maintain a direct route.

5 Claims, 4 Drawing Sheets

FIG. 3

| PIN NUMBER | SIGNAL NAME | I/O | SIGNAL TYPE | NOTE |
|---|---|---|---|---|
| 1 | TPO+ | OUTPUT | TRANSMITTING DATA | |
| 2 | TPO- | OUTPUT | TRANSMITTING DATA | |
| 3 | TPI+ | INPUT | TRANSMITTING DATA | |
| 4 | — | — | — | UNUSED |
| 5 | — | — | — | UNUSED |
| 6 | TPI- | INPUT | RECEIVING DATA | |
| 7 | — | — | — | UNUSED |
| 8 | — | — | — | UNUSED |

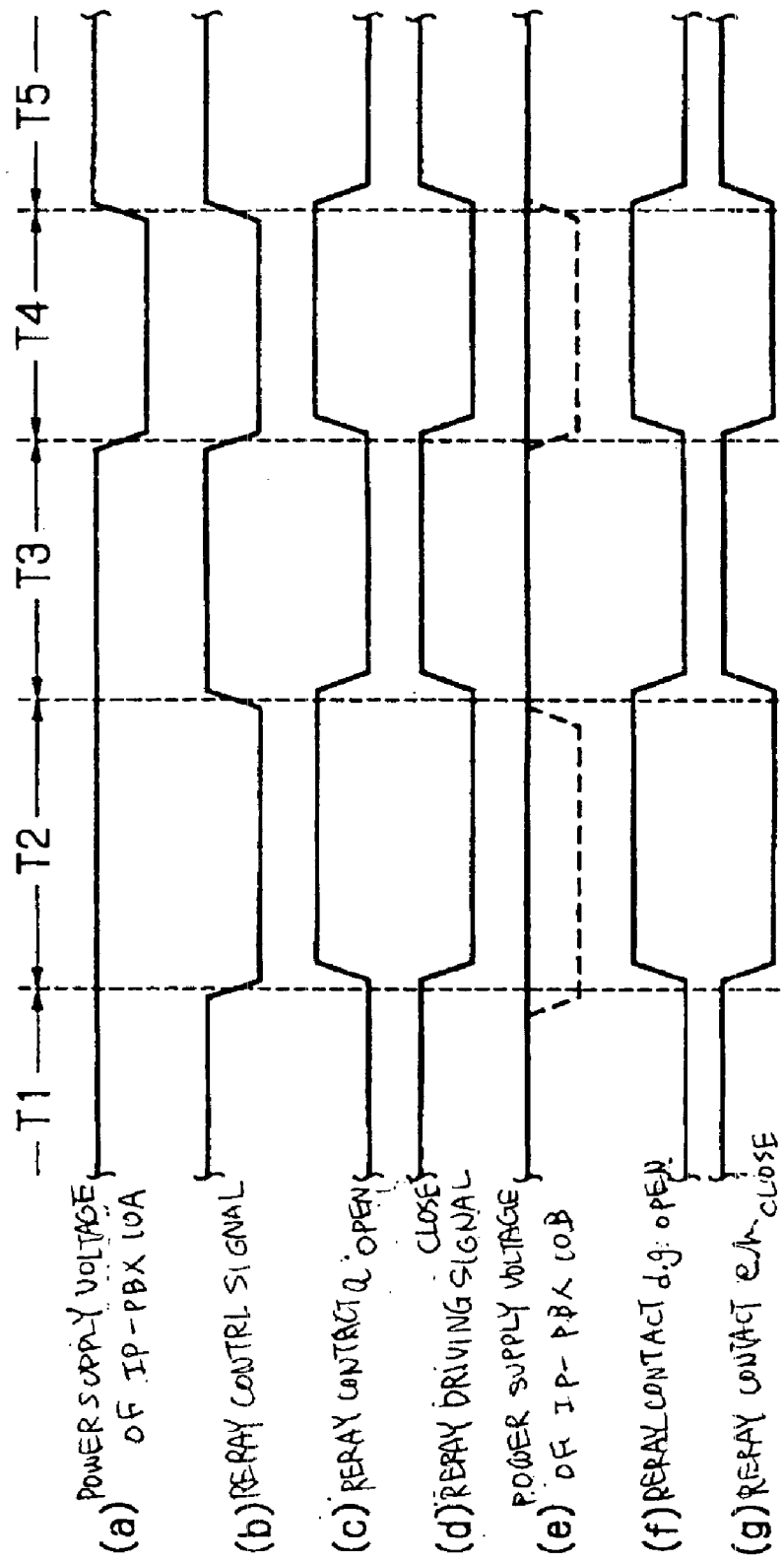

DIGITAL EXCHANGING APPARATUS AND METHOD OF COMMUNICATION CONTROL

TECHNICAL FIELD

The invention relates to a exchanging apparatus and method of communication control, and more specifically to an IP packet exchange including protection switching for power failure.

BACKGROUND OF THE INVENTION

A conventional Private Branch eXchange (PBX) in local area has packet management interface, switch, and control system for Public Switch Telephone Network (PSTN) circuit and Subscriber Line Interface Circuit (SLIC). The PBX has supervisory system for power supply, and also has an extra route connecting between PSTN circuit and SLIC. The extra route connects PSTN interface and SLIC interface directory. For example, SLIC detects power failure by supervising voltage, and according to the detection, supplies relay driving voltage via control part to switching relay in the PBX. The protection switching is generally provided by switching the direct route.

In Local Area Network (LAN), a LAN switch is connected to data terminals which have 1~100 Mbps transmission speed via twisted pair cable or optical fiber cable. The LAN switch exchanges Media Access Control (MAC) packet with the terminals via Media Access Control (MAC) layer. The terminals communicate with other terminals in connection less environment wherein MAC address and terminal number are used in stead of circuit switching. Now, voice data communication using internet telephony is becoming popular. Internet telephony call is realized by software using communication protocol.

With the spread of LAN, it will be seen that the PBX and the internet telephony exist together. This means coexistence of networks which have different transmission line and switching method. IP(internet protocol)-PBX is a switching system which communicates integrated voice and data between PSTN and LAN.

Protection switching for power failure in IP-PBX is provided by using extra direct route without LAN switch when the PBX has PSTN interface and SLIC interface including packet processing.

SUMMARY OF THE INVENTION

IP-PBX has both of PSTN interface and SLIC interface in it, but in some cases, PSTN interface and SLIC interface are placed in different IP-PBXs. For example, when the different IP-PBXs are connected by 10BASE-T LAN cable, which has a maximum length of 100 m, and are to have protection against power failure, those IP-PBXs have to have extra cable which has a same length as the LAN cable connecting between IP-PBXS.

Japanese Patent Laid-Open Publication No. HEI 11-4620 shows a connection apparatus between LANs utilizing router for Wide Area Network (WAN). This apparatus can detect failures of hardware and software in router without redundant route in WAN, rewriting of routing information and existence of same IP address for protection switching, and also network supervisory system monitors stand-by system. Therefore, the apparatus have two routers correspondent to protection switching. However, such structure has redundancy.

It is therefore an object of the invention to provide a digital exchange method and a method of communication control without an expensive provision for protection against failure when two types of digital exchange, for example, corresponding to PSTN and SLIC are required.

According to one aspect of the present invention, for achieving the object, there is provided, as a specific configuration, a digital exchanging apparatus comprising exchanging means changing direction of input information to destination network, first information converting means converting information between the switch and the first information converting means into information for the destination network, first interface means connecting the first information converting means with the destination network, first switching means switching connection between networks according to failure of the apparatus, first information exchanging means including controlling means to control the switching means according to failure detection of the apparatus, second information converting means converting information communicated between converting means via LAN, second interface means connecting the first information converting means with the destination network, second information exchanging means connected to network via the second interface means including second switching means switching connection to the second interface means to connection to extra route circuit according to information from first information exchanging means, and LAN interface means connected to the first information exchanging means and second information exchanging means.

According to another aspect of the present invention, the LAN interface means connect the first interface means with transmission lines for normal and anomalous condition, and connect an information line to get switching information from the first switching means with the LAN interface means, and connect the second interface means with a line for normal condition, and connect the second switching means with a line for anomalous condition, and connect a line to transmit switching information from the first switching means to the second switching means with the LAN interface means.

According to another aspect of the present invention, the LAN interface means utilize an available line of cable in the first and second information exchanging means as a line for anomalous condition.

According to another aspect of the present invention, a method of communication control between different digital exchanging apparatus connected with LAN for processing information from networks, the method comprising transmitting control signal to other exchanging apparatus according to detection of failure in one exchanging apparatus, transmitting drive signal as said control signal to the other exchanging apparatus for switching active line to stand-by line, and switching active line to stand-by line according to the drive signal.

According to another aspect of the present invention, the failure is detected in a response from the other exchanging apparatus to a packet received from the one exchanging apparatus.

According to another aspect of the present invention, the failure is recovered by detection of response from the other exchanging apparatus according to information from the one exchanging apparatus.

According to another aspect of the present invention, a method of communication control between different digital exchanging apparatus connected with LAN for processing information from networks, the method comprising connecting available lines of LAN interface means with active line and stand-by line, and connecting the LAN interface means with information line to transmit switching information for switching said active line and stand-by line.

BRIEF DESCRIPTION OF THE DRAWINGS

FIG. 3 is a list for relation of pin allocation and signals in LAN interface shown in FIG. 1;

FIG. 4 is a timing chart showing operation of normal and anomalous condition.

DESCRIPTION OF THE PREFFERED EMBODIMENTS

Figure 1:
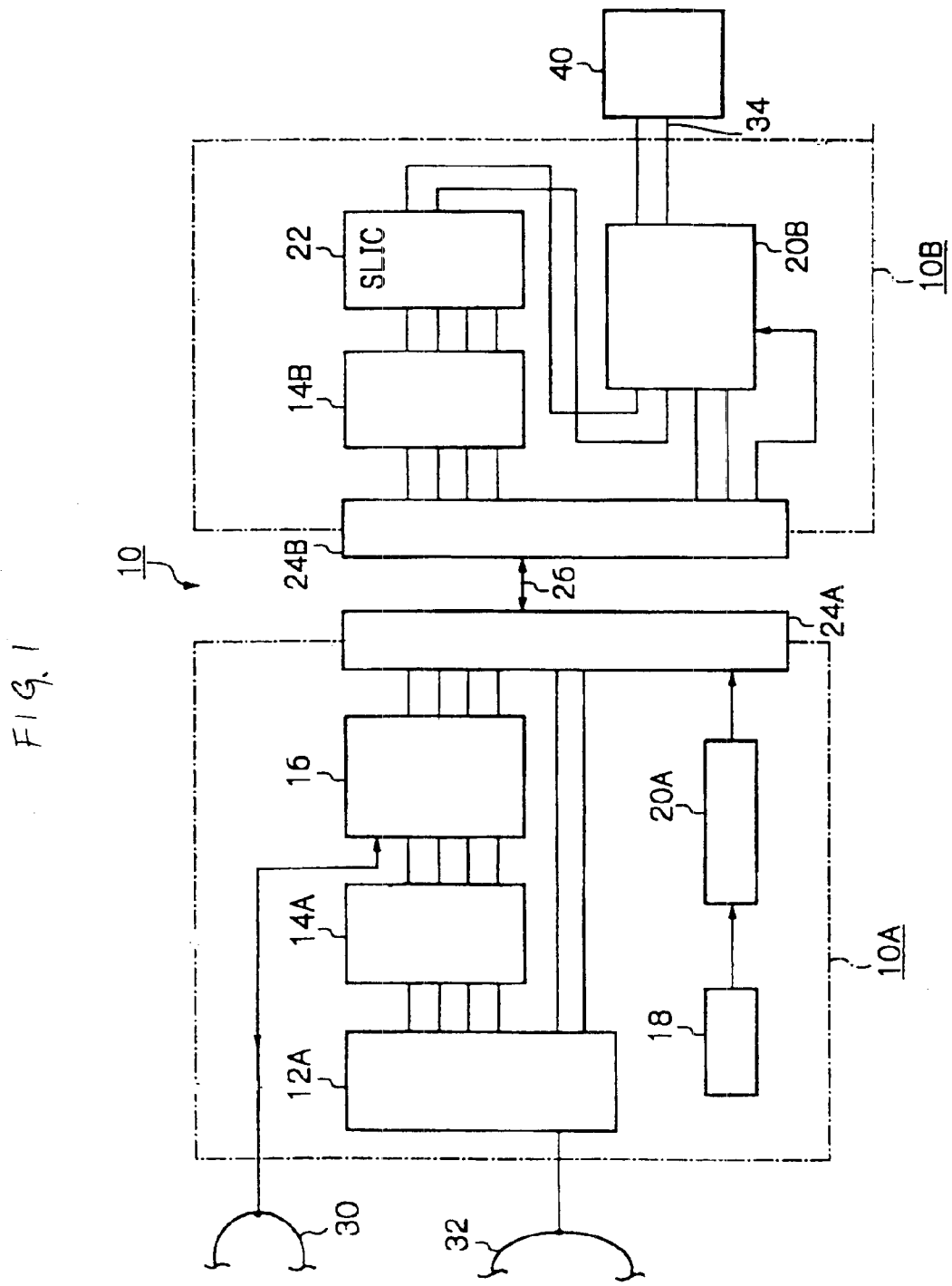
FIG. 1 is a block diagram of a digital exchanging apparatus, used for a digital exchange.

FIG. 1 is a block diagram showing a digital exchange of the present invention provides exchanging system to communicate integrated voice data between networks including different transmission line or switching method.

The digital exchange 10 has Private Branch eXchange (PBX) 10A and 10B which can communicate by internet protocol (IP), and the PBX 10A and 10B are connected with LAN. This construction is IP-PBX. IP-PBX 10A has a public network IF block 12A, a packet processing block 14A, LAN switch block 16, control block 18 and switching block 20A. IP-PBX 10B has packet processing block 14B, SLIC 22 and switching block 20B. The IP-PBX 10A has a LAN interface block 24A and the IP-PBX 10B has a LAN interface block 24B, and the LAN interface block 24A and 24B are connected with a LAN cable 26. In this embodiment, eight LAN cables are bound into one cable. The IP-PBX 10A is, not shown, for example, connected to the internet 30 via router or gateway, and connected to a public network 32. The IP-PBX 10B is, for example, connected to a telephone 40 via a subscriber line 34.

The public network IF block 12A sets interface according to the type of line, and includes Public Switched Telephone Network (PSTN) interface circuit. For example, a telephone line, packet switching network, Integrated Service Network (ISDN), frame relay network, cell relay network are public networks. In the public network, trunk circuit controls. For example, the trunk circuit has analog office line interface circuit to connect PBX and analog telephone network, ISDN basic interface, digital office line interface circuit based on primary rate interface and packet network interface circuit.

The packet processing block 14A, 14B fragments variable length input data into packets with header and transmitting priority of a predefined length, and stores and outputs it. The LAN switching block 16 is a digital switch in PBX, that is, highway switch, and includes a gate circuit corresponding to cross bar switch, and controls on-off of the gate circuit according to control of control block 18. It is also possible that the LAN switching block 16 is regarded as channel switch for LAN terminal. The LAN switching block 16 is switching block to communicate directly to each terminal utilizing MAC address and terminal number.

The control block 18 has Central Processing Unit (CPU) to control the digital exchange 10, and also process call processing exchanging process, for example, failure, operation and maintenance and execution control. The control block 18, shown later, transmits a control signal according to detection of failure, and utilizes that relay drive signal since the control signal is not supplied to the switching block 20A during power failure.

Figure 2:
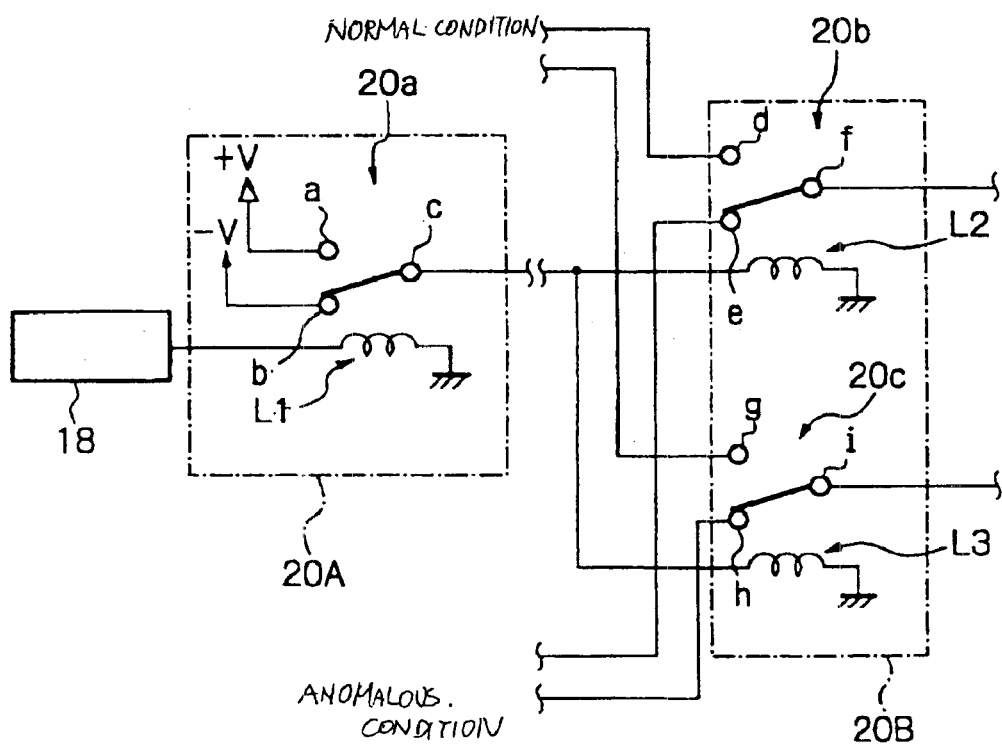
FIG. 2 shows a circuit for switching block shown in FIG. 1.

FIG. 2 shows the switching block 20A, 20B, which has coils and relay circuits including switch-to-switch signal.

The switching block 20A includes relay circuit 20a. One side of coil L1 in the relay circuit 20a connects to the control block 18, and the other side of it connects to ground. Contact a of the relay switch connects to power supply +V, and contact b of the relay switch connects to power supply −V. However, power supply is switched off during power failure, and as shown in FIG. 2, movable contact cannot contact with the contact a. This is the same for the relay circuits 20b and 20c.

The switching block 20B includes relay circuit 20b and 20c. One side of coil L2 and L3 in the relay circuit 20b and 20c connects to a contact c in the relay circuit 20a, and the other side of those connects to ground. Contact d in relay circuit 20b and contact g in relay circuit 20c connect to active transmission lines, and contact e in the relay circuit 20b and contact h in the relay circuit 20c connect to stand-by transmission lines. These connections, as shown in FIG. 1, maintain circuit between the public network 32 and the telephone 40 via active or stand-by transmission lines, contact f and contact i. During power failure, the relay driving voltage is not supplied, and each movable contact in the relay circuits changes the contact position from active contacts d and g to stand-by contacts e and h.

The SLIC 22 is a kind of subscriber circuits, and provides supply of current for telephone, call signal, supervision of subscriber interface function such as, for example, end of call and service function according to subscriber class.

Module connector RJ45 having eight pins and using only for LAN is utilized for the LAN interface block 24A and 24B. FIG. 3 shows correspondence between pin numbers and signal connecting of connector. Because signals (data) in LAN are transmitted by balanced transmissions, "+" and "−" of signal names in FIG. 3 show polarity of signals. Pin numbers. 1 and 2 of the module connector RJ45 transmit transmitting data, and pin numbers 3 and 6 of the module connector RJ45 transmit receiving data. In this embodiment, unused pin numbers 4, 5, 7 and 8 are utilized for the LAN interface block 24A and 24B. For example, one side of an active transmission line connects to one side of a stand-by transmission line in the public network IF block 12, and the other side of the active and stand-by transmission lines connects to pin numbers 4 and 5 of the LAN interface block 24A. The pin numbers 4 and 5 connect to the contacts e and h in the switching block 20B for stand-by transmission line in the LAN interface block 24B. The pin number 7 utilizes for transmission line of switching informing signal between the IP-PBX 10A and 10B. The contact c in the relay circuit 20a connects to pin number 7 in the LAN interface block 24A, and pin number 7 in the LAN interface block 24B connects to the contact e and h in the switching block 20B.

Thus, three pins of four unused pins are utilized for one direction of transmission, and it is discretionary how to chose the three pins form the four unused pins. Because of advance connection utilizing unused pins, there is no need of extra cable for protection switching.

FIG. 4 shows a timing chart of actions in the digital exchange 10 in normal and anomalous (power failure) conditions. There are five periods in the timing chart, that is, period T1 for normal operation, period T2 for switching by the control block 18, period T3 for switching back from the period T2, period T4 for power failure and period T5 for recovery. As shown in FIG. 4(a), the IP-PBX 10A gets a power supply except for the period T4.

Now referring to the timing chart, in period T1, the control block 18, shown in FIG. 4(b), transmits level [H] as relay control signal to the switching block 20A. The relay circuit 20a controls the coil L1 according to the relay control signal, and contacts the movable contact with the contact a by electromagnetic force of the coil L1. This condition is closing condition shown in FIG. 4(c). At this point, the relay circuit 20a transmits a relay driving signal to the switching block 20B in the IP-PBX 10B via the contacts a and c. As a result, the relay driving signal, shown in FIG. 4(d), supervises power supply voltage of the IP-PBX 10A. At this point, the power supply voltage is level [H] because the IP-PBX 10B is operating normally. The contacts d and g in the relay circuit 20b and 20c are closed with the movable contact, and the contacts e and h in the relay circuits 20b and 20c are opened with the movable contact. Therefore, the active transmission line is valid, and the telephone 40 connects to the public network 32.

The control block 18, shown in FIG. 4(b), changes level of the relay control signal to level [L]. The control block 18 outputs orders to transmit IP packet (no voice signal) for checking connection to the IP-PBX 10B. For example, ping packet to check connection between computers on TCP/IP network is utilized for the IP packet. The ping packet can check whether target computer is operated and can communicate on IP level. If the control block 18 cannot get a response from the IP-PBX 10B, it transmits level [L] of the relay control signal to the relay circuit a indicating that the IP-PBX 10B is in power failure condition or a LAN failure. The relay circuit 20a opens the contact a according to the relay control signal. At this point, power supply for the IP-PBX 10A is maintained, and shown in FIG. 2, it is possible to supply voltage-V to the IP-PBX 10B via contact b for the failure. It is possible that the relay driving signal shown in FIG. 4(d) is same as GND level, and because the coil L1 does not have applied voltage, the relay contact is opened. Because there is no supply of the relay driving signal, the relay contacts d and g are opened and the relay contacts e and h are closed in the relay circuit 20b and 20c. Thus, protection switching from active transmission line to stand-by transmission line is provided. In recovery from failure, that is, switching back, the control block 18 detects a recovery based on a response from the IP-PBX 10B, and orders to change the relay control signal to level [H]. With the result, shown in FIG. 4, action of period T3 is opposite from action of period T2, and active transmission line is valid.

Because of a power failure in the IP-PBX 10A, shown in FIG. 4(a), period T4, the control block 18 cannot control the switching block directly, and the relay signal to the IP-PBX 10B cannot be transmitted. Therefore, the relay contacts d and g are opened and the relay contacts e and h are closed in the relay circuit 20b and 20c. Due to the changing of the condition of each contact, stand-by transmission lines are valid. With the result, the telephone 40 and the public network 32 are connected directly, and for example, during power failure of the digital exchange 10, voice call is maintained.

In period T5, first of all, the control block 18 in IP-PBX 10A is set up when recovering from a power failure. The control block 18b in IP-PBX 10A transmits the check command to the IP-PBX 10B, and check response from the IP-PBX 10B. If the control block 18 in IP-PBX 10A receives a response from the IP-PBX 10B, it outputs orders to change the relay driving signal shown in FIG. 4(b) to level [H]. According to supply of the relay driving signal, the switching block 20B changes stand-by transmission line to active transmission line same as period T3.

In summary, it will be seen that the present invention provides IP-PBXs having different structure. For example, stand-by and active transmission lines are connected between available pins of the interface block 24A and 24B to supply the relay driving signal from the switching block 20A to the switching block 20B according to a control signal from the control block 18, and change the transmission lines, and maintain a direct route.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A digital exchange system comprising:

a first digital exchange coupled to a first network, a second network, and a local area network (LAN), said first digital exchange comprising:
   a first LAN interface coupled to said LAN;
   a LAN switch coupled to said first LAN interface and said first network;
   a first packet processor coupled to said LAN switch;
   a first network interface coupled to said first packet processor, said first LAN interface, and said second network;
   a first switch coupled to said first LAN interface; and
   a controller coupled to said first switch; and a second digital exchange coupled to said local area network (LAN) and a subscriber, said second digital exchange comprising:
   a second LAN interface coupled to said LAN;
   a second packet processor coupled to said second LAN interface;
   a subscriber interface coupled to said second packet processor; and
   a second switch coupled to said subscriber interface, said second LAN interface, and said subscriber;

wherein said controller, said first switch, and said second switch control connections between said subscriber, said first network, and said second network based on a detected failure in said system.

2. A digital exchange system as in claim 1, wherein said first LAN interface and said second LAN interface are adapted to provide a non-failure mode connection between said first digital exchange and said second digital exchange, a failure mode connection between said first digital exchange and said second digital exchange, and a control connection from said first switch of said first digital exchange to said second switch of said second digital exchange.

3. A digital exchange system as in claim 2, wherein said non-failure mode connection and said failure mode connection use separate lines of said first LAN interface and said second LAN interface.

4. A digital exchange system as in claim 3, wherein said non-failure mode connection connects said LAN switch and said second packet processor, and said failure mode connection connects said first network interface and said second switch.

5. A digital exchange system as in claim 1, wherein said system is adapted to connect said subscriber to said first network and said second network during non-failure operation of said system and to connect said subscriber to said second network during failure operation of said system.

* * * * *